(12) United States Patent
Otsuki

(10) Patent No.: US 8,368,782 B2
(45) Date of Patent: Feb. 5, 2013

(54) MULTIPLE EXPOSURE IMAGE PICKUP APPARATUS, MULTIPLE EXPOSURE IMAGE PICKUP METHOD, PROGRAM, AND RECORDING MEDIUM

(75) Inventor: Hiroki Otsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 12/502,495

(22) Filed: Jul. 14, 2009

(65) Prior Publication Data

US 2010/0053374 A1 Mar. 4, 2010

(30) Foreign Application Priority Data

Aug. 27, 2008 (JP) ................... 2008-218010

(51) Int. Cl.
*H04N 9/64* (2006.01)
*H01L 27/00* (2006.01)

(52) U.S. Cl. ............ 348/243; 348/251; 250/208.1

(58) Field of Classification Search ............ 348/231.99, 348/246, 241, 251, 243; 250/208.1
See application file for complete search history.

(56) References Cited

U.S. PATENT DOCUMENTS 5,812,703 A * 9/1998 Juen et al. .................. 382/274
2001/0028398 A1 * 10/2001 Takahashi .................. 348/232
2006/0082665 A1 * 4/2006 Mizukura et al. ........... 348/272
2009/0009614 A1 * 1/2009 Kawai ...................... 348/208.12

FOREIGN PATENT DOCUMENTS

| JP | 9-18793 | 1/1997 |
|---|---|---|
| JP | 2001-28726 | 1/2001 |
| JP | 2002-135647 | 5/2002 |
| JP | 2002-218313 | 8/2002 |
| JP | 2005-191641 | 7/2005 |
| JP | 2006-345454 | 12/2006 |
| JP | 2007-166024 | 6/2007 |

OTHER PUBLICATIONS

Foreign Office Action issued Aug. 3, 2010 in JP Application No. 2008-218010.

* cited by examiner

*Primary Examiner* — Aung S Moe
*Assistant Examiner* — Mekonnen Dagnew
(74) *Attorney, Agent, or Firm* — Oblon, Spivak, McClelland, Maier & Neustadt, L.L.P.

(57) ABSTRACT

An image pickup apparatus includes a frame operation unit configured to perform addition to or subtraction from a frame and a storage unit configured to store a result of an operation performed by the frame operation unit. A data bus including two channels, one for writing to the storage unit and the other for reading from the storage unit, is provided between the frame operation unit and the storage unit.

11 Claims, 12 Drawing Sheets

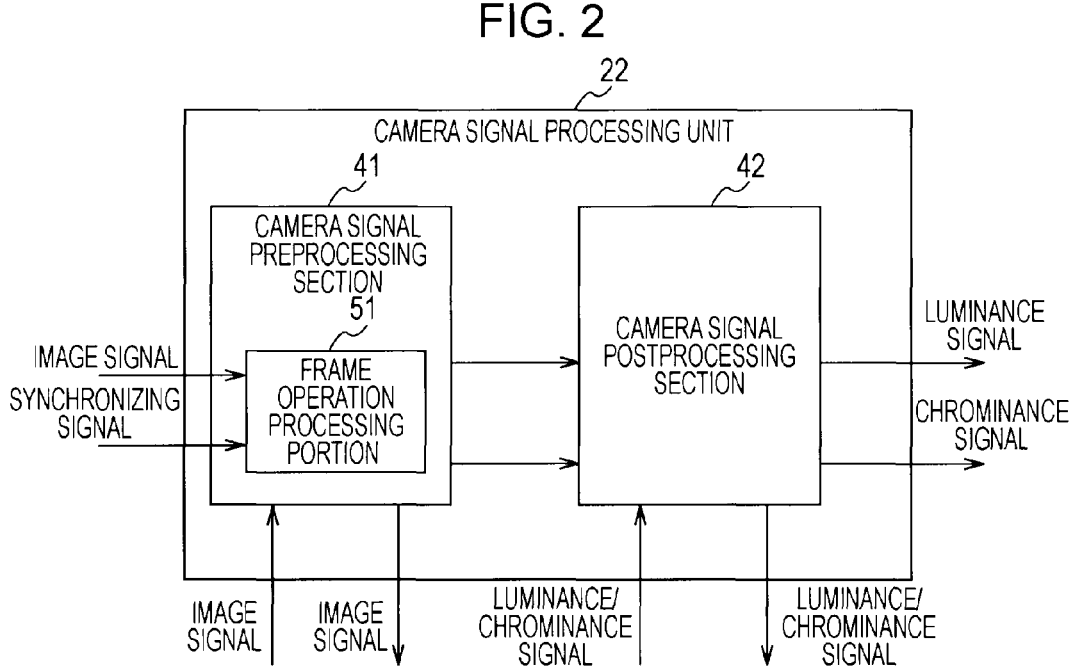
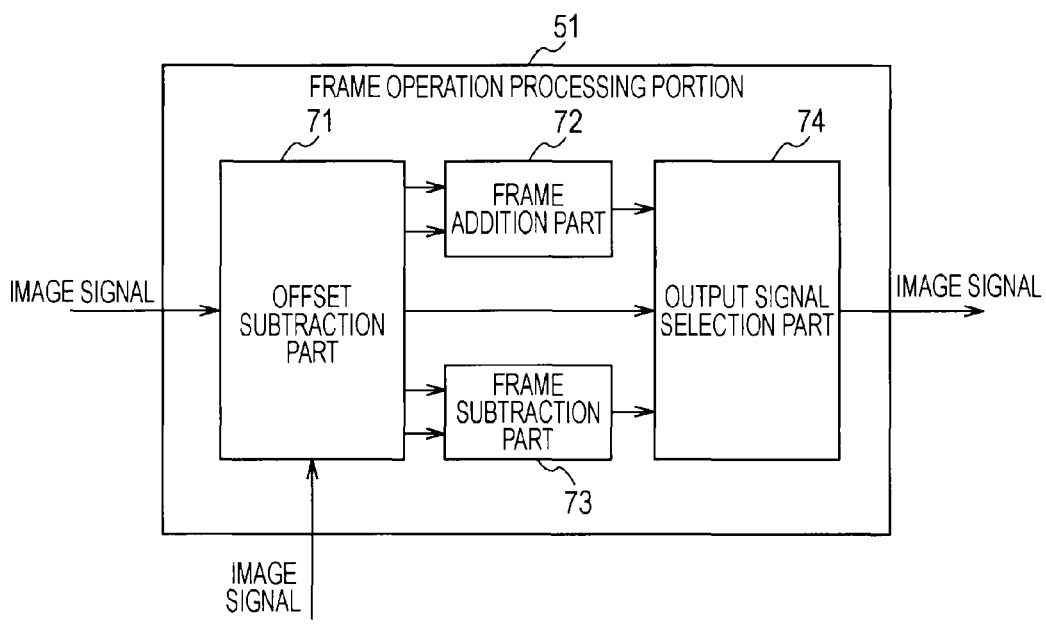

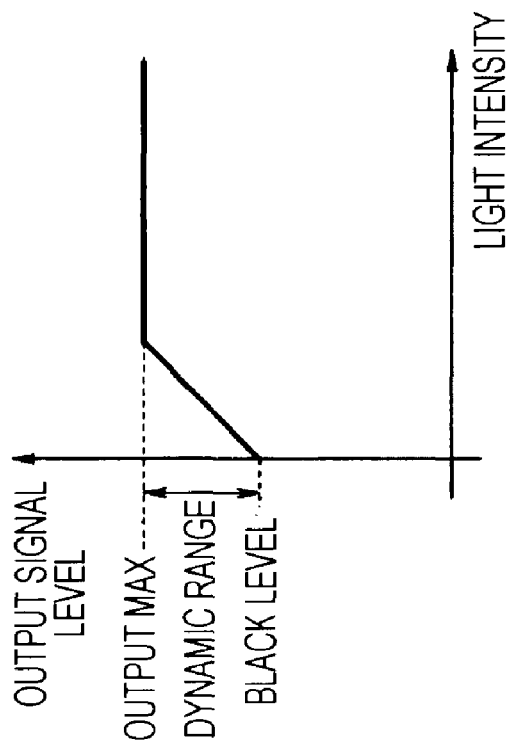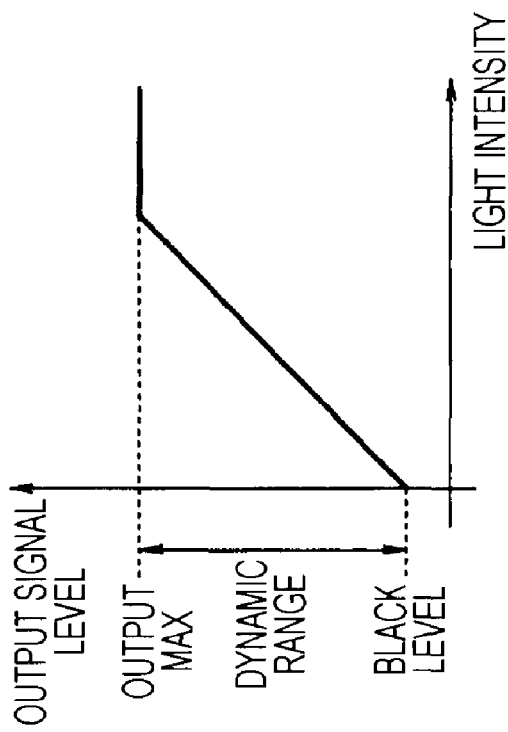

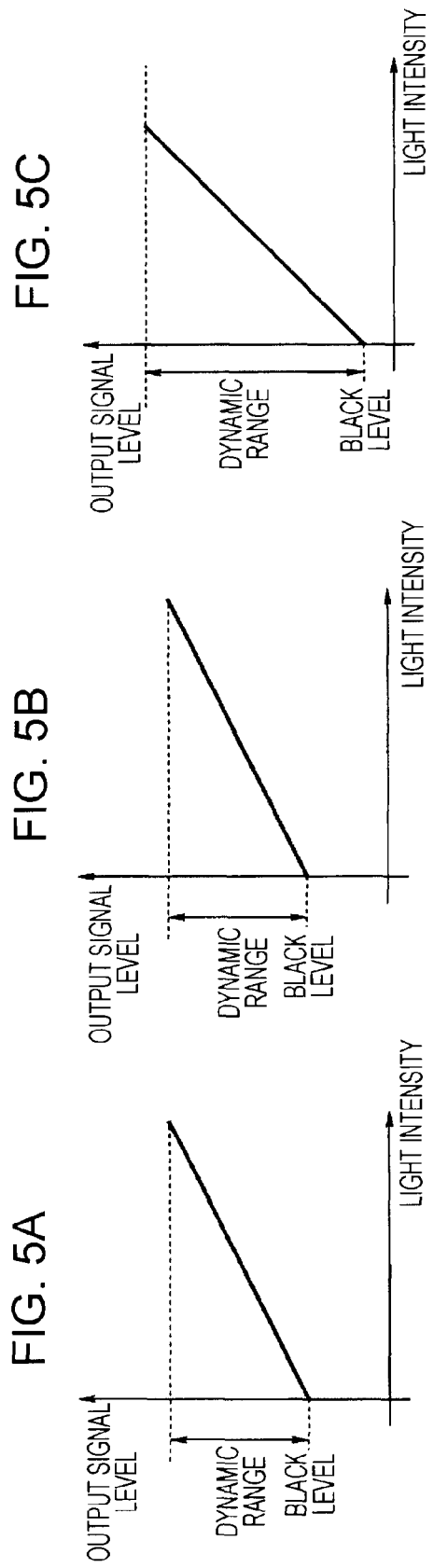

MULTIPLE EXPOSURE IMAGE PICKUP APPARATUS, MULTIPLE EXPOSURE IMAGE PICKUP METHOD, PROGRAM, AND RECORDING MEDIUM

BACKGROUND OF THE INVENTION

1. Field of the Invention

The present invention relates to image pickup apparatuses, image pickup methods, programs, and recording media. In particular, the present invention relates to an image pickup apparatus, an image pickup method, a program, and a recording medium which are preferably applied to processing associated with multiple exposure.

2. Description of the Related Art

There is a photographing technique called multiple exposure, for use in cameras for picking up images. In multiple exposure, a single frame is exposed multiple times, to light corresponding to a single or a plurality of image objects, and a plurality of images are superimposed to create a combined image. In particular, in multiple exposure photography with a long exposure time using a slow shutter or a bulb shutter, multiple exposure realizes photographs of night scenes, fireworks, or the like, with highly artistic effects.

In film cameras using a film as a recording medium, multiple exposure photography is realized by operating the shutter multiple times without winding the film on. In digital image pickup apparatuses such as digital still cameras and digital video cameras which have recently been in widespread use, multiple exposure is not realized using the same processing as in employed in film cameras. However, there has been a necessity for a digital image pickup apparatus having a multiple exposure function, similarly to film cameras, and such a digital image pickup apparatus has gradually become commercially available.

To realize a multiple exposure function in a digital image pickup apparatus, it is necessary to save a plurality of images in order to generate a combined image. This saving operation necessitates a large-capacity storage device such as a memory for saving a plurality of images, which leads to increases in the size and cost of the image pickup apparatus. In particular, with the recent trend of increase in the number of pixels and downsizing of image pickup devices, such large-capacity storage devices may cause an increase in size of the apparatus.

In addition, an increase in the memory capacity may increase the memory bandwidth. An increase in the memory bandwidth may cause a conflict with other functions using the memory, which would significantly affect the processing performance of the entire system of an image pickup apparatus, such as the photographing speed.

Further, in multiple exposure with a long exposure time, the sensitivity and dynamic range of an image pickup device may be decreased by an increase in a black signal level and generation of fixed pattern noise which are associated with a so-called dark current in a solid-state image pickup device. Such a dark current is caused by electron-hole pairs generated as a result of thermal excitation of a semiconductor. The effect of a dark current increases with increasing temperature and increasing storage time of electric charge.

Japanese Unexamined Patent Application Publication No. 2001-28726 discloses a multiple-exposure photography method. In this method, a main image signal is generated by extracting main object parts from a plurality of images and recording an image corresponding to a difference between two consecutive main image signals. Accordingly, this makes it possible to reduce a memory capacity necessary for generating a combined image.

SUMMARY OF THE INVENTION

In the above method disclosed in Japanese Unexamined Patent Application Publication No. 2001-28726, it is necessary to provide independent devices such as image extracting means and first and second main image holding means. Thus, downsizing of the entire apparatus may not be achieved, and image extracting processing may decrease processing speed. In addition, the problem of the decreases of sensitivity and dynamic range associated with multiple exposure with a long exposure time may not be solved by the above method.

The present invention has been made in view of the above circumstances. Accordingly, in multiple exposure performed in a digital image pickup apparatus such as a digital still camera, there is a need for a technique for enhancing processing performance while saving the memory capacity and memory bandwidth and suppressing decreases in sensitivity and dynamic range in a long exposure.

According to an embodiment of the present invention, when a combined image is generated by exposing a single frame multiple times to light from a single object or a plurality of objects and superimposing a plurality of images, an image pickup apparatus includes frame operating means configured to perform addition to or subtraction from the frame and storing means configured store a result of an operation performed by the frame operating means. In the image pickup apparatus, a data bus including two channels, one for writing to the storing means and the other for reading from the storing means, is provided between the frame operating means and the storing means.

In the image pickup apparatus according to an embodiment of the present invention, the frame operating means may include offset subtracting means configured to subtract a predetermined offset signal from a signal supplied from an image pickup device.

In the image pickup apparatus according to an embodiment of the present invention, reading of a signal from the image pickup device may be performed at a time during an exposure before the output signal level of the image pickup device is saturated, and subtraction of an offset signal component from the signal read from the image pickup device may be performed by the offset subtracting means.

In the image pickup apparatus according to an embodiment of the present invention, a signal in a raw data format supplied from the frame operating means may be compressed and then stored in the storing means, and the compressed signal supplied from the storing means may be decompressed into a raw data format and then supplied to the frame operating means.

In the image pickup apparatus according to an embodiment of the present invention, in frame addition and in frame subtraction, the frame operating means may perform frame operation processing on an image read from the storing means, simultaneously with reading from the image pickup device.

In the image pickup apparatus according to an embodiment of the present invention, when a combined image is generated by exposing a single frame multiple times to light from a single object or a plurality of objects and superimposing a plurality of images, a data bus including two channels, one for writing to the storing means and the other for reading from the storing means, is provided between frame operating means configured to perform addition to or subtraction from the frame and storing means configured store a result of an operation performed by the frame operating means.

According to an embodiment of the present invention, for an image pickup apparatus including at least an image pickup device, storing means configured to store a signal from the image pickup device, and operating means configured to perform an operation using the signal from the image pickup device and a signal stored in the storing means, an image pickup method includes the steps of: storing a signal obtained from the image pickup device when an image of a predetermined image object is picked up, in the storing means; when another signal is obtained from the image pickup device, reading the signal stored in the storing means, adding the other signal to the signal stored in the storing means, and storing the result of the addition in the storing means; after the addition is repeated a predetermined number of times obtaining a black signal from the image pickup device, the black signal being obtained by performing an exposure for the same period of time as an exposure time taken to obtain the signal, reading the signal stored in the storing means, subtracting the black signal from the signal, and storing the result of the subtraction in the storing means; and repeating the subtraction a predetermined number of times.

The image pickup method according to an embodiment of the present invention may also include the step of subtracting a predetermined offset signal component from a signal supplied from the image pickup device.

In the image pickup method according to an embodiment of the present invention, reading of a signal from the image pickup device is performed at a time during an exposure before the output signal level of the image pickup device is saturated, and the subtraction of an offset signal component from the signal read from the image pickup device is performed.

A computer-readable program causing an image pickup apparatus which includes at least an image pickup device, storing means configured to store a signal from the image pickup device, and operating means configured to perform an operation using the signal from the image pickup device and a signal stored in the storing means, to execute processing which includes the steps of: storing a signal obtained from the image pickup device when an image of a predetermined image object is picked up, in the storing means; when another signal is obtained from the image pickup device, reading the signal stored in the storing means, adding the other signal to the signal stored in the storing means, and storing the result of the addition in the storing means; after the addition is repeated a predetermined number of times obtaining a black signal from the image pickup device, the black signal being obtained by performing an exposure for the same period of time as an exposure time taken to obtain the signal, reading the signal stored in the storing means, subtracting the black signal from the signal, and storing the result of the subtraction in the storing means; and repeating the subtraction a predetermined number of times.

A recording medium recording a computer-readable program which causes an image pickup apparatus which includes at least an image pickup device, storing means configured to store a signal from the image pickup device, and operating means configured to perform an operation using the signal from the image pickup device and a signal stored in the storing means, to execute processing which includes the steps of: storing a signal obtained from the image pickup device when an image of a predetermined image object is picked up, in the storing means; when another signal is obtained from the image pickup device, reading the signal stored in the storing means, adding the other signal to the signal stored in the storing means, and storing the result of the addition in the storing means; after the addition is repeated a predetermined number of times obtaining a black signal from the image pickup device, the black signal being obtained by performing an exposure for the same period of time as an exposure time taken to obtain the signal, reading the signal stored in the storing means, subtracting the black signal from the signal, and storing the result of the subtraction in the storing means; and repeating the subtraction a predetermined number of times.

In the image pickup method and the program according to an embodiment of the present invention, a signal supplied from an image pickup device which is obtained when an image of a predetermined image object is picked up is stored, when another signal is obtained from the image pickup device, the stored signal is read out and added to the read signal. The resultant signal is stored back in the storing means. After the addition is repeated a predetermined number of times, a black signal, which is obtained by performing an exposure for the same period of time as an exposure time taken to obtain the signal from the image pickup device, is obtained, and the signal stored in the storing means is read out. The black signal is subtracted from the read signal, and the resultant signal is stored back to the storing means. The subtraction is repeated predetermined number of times. Through the processing, a multiple-exposure image is generated.

According to an embodiment of the present invention, in multiple exposure performed in a digital image pickup apparatus such as a digital still camera, necessary memory capacity and memory bandwidth can be reduced. In addition, according to an embodiment of the present invention, a multiple exposure operation with increased processing performance can be realized while suppressing decreases in sensitivity and dynamic range in a long exposure.

BRIEF DESCRIPTION OF THE DRAWINGS

FIG. 2 illustrates an internal configuration of a camera signal processing unit;

FIG. 3 illustrates an internal configuration of a frame operation processing portion;

FIGS. 4A and 4B illustrate a dynamic range;

FIGS. 5A to 5C illustrate a dynamic range;

DESCRIPTION OF THE PREFERRED EMBODIMENTS

In the following, the preferred embodiments of the present invention will be described with reference to the accompanying drawings.

Figure 1:
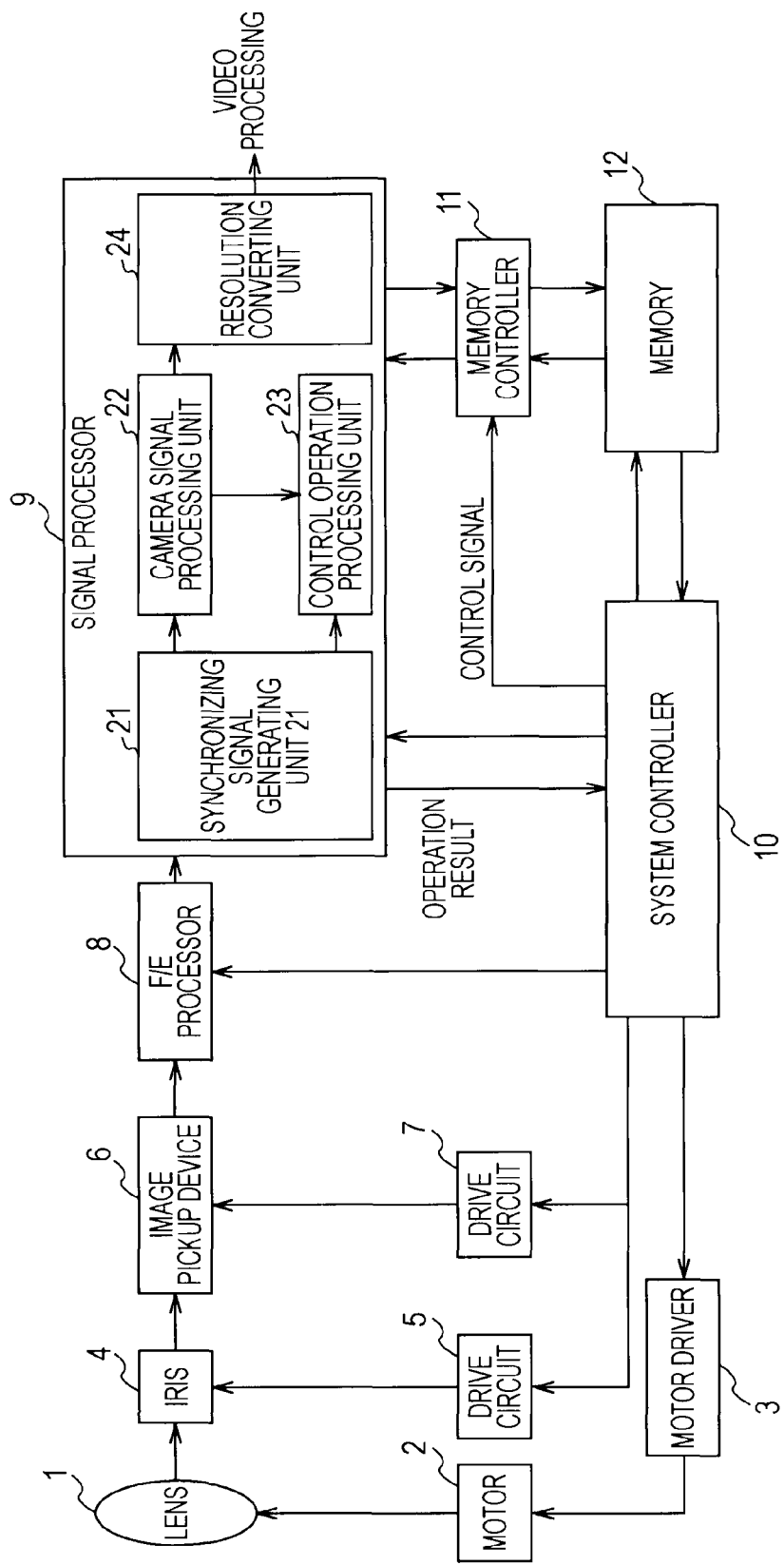
FIG. 1 illustrates a configuration of a multiple-exposure device according to an embodiment of the present invention.

FIG. 1 illustrates a configuration of a multiple-exposure device according to an embodiment of the present invention. This multiple-exposure device may be applied or incorporated into a digital image pickup apparatus such as a digital still camera and a digital video camera, for example.

The multiple-exposure device illustrated in FIG. 1 includes a lens 1, a motor 2, a motor driver 3, an iris 4, a drive circuit 5, an image pickup device 6, a drive circuit 7, a front-end (F/E) processor 8, a signal processor 9, a system controller 10, a memory controller 11, and a memory 12. The signal processor 9 includes a synchronizing signal generating unit 21, a camera signal processing unit 22, a control operation processing unit 23, and a resolution converting unit 24.

The lens 1 collects light incident from a light source and reflected light from an image object. The motor 2 is driven under the control of the motor driver 3 and adjusts the position of the lens 1 according to a focal length and a focal position for the image object. The motor driver 3 operates in accordance with control signals from the system controller 10. The motor driver 3 determines the focal length, i.e., zoom position, in response to the change of magnification made by a user, and controls the motor 2 in accordance with the determination.

The iris 4 is driven by the drive circuit 5. The iris 4 performs processing such as adjustment of aperture in accordance with the luminance of the object and determination of the quantity of light (light intensity) passing through the lens 1, i.e., exposure amount. The image pickup device 6 performs photoelectric conversion on optical signals transmitted through the iris 4 using the drive circuit 7, and outputs resultant electric charge signals to a downstream unit. The image pickup device 6 may be formed of a device such as a CCD (charge-coupled device) and a CMOS (complementary metal-oxide semiconductor).

The F/E processor 8 performs processing such as noise reduction and amplification on analog charge signals and converts the signals into digital signals. Although not shown in FIG. 1, the F/E processor 8 includes a CDS (correlated double sampling) unit for sampling an input signal and holding a resultant sampling value (sample holding), an automatic gain control unit for performing amplification processing, and an A/D (analog/digital) conversion unit for performing analog-digital conversion. Note that the F/E processor 8 may be provided on the same board as the image pickup device 6 to form a structure of an image sensor employing a column AD conversion scheme or the like.

The signal processor 9 performs correction processing on an object image signal, which has been converted into a digital signal by the F/E processor 8. Such correction processing depends on the lens, 1, the iris 4, the image pickup device 6, and the like. The signal processor 9 performs camera control processing such as AWB (automatic white balance) processing, AE (automatic exposure) processing, and AF (automatic focus) processing to generate an image signal (luminance signal and chrominance signal) corresponding to the image object.

The signal processor 9 is composed of the synchronizing signal generating unit 21, the camera signal processing unit 22, the control operation processing unit 23, and the resolution converting unit 24. The synchronizing signal generating unit 21 generates horizontal and vertical synchronizing signals and various timing signals. The camera signal processing unit 22 performs control processing in accordance with a control signal supplied from the system controller 10 and generates an image signal corresponding to an image object. The control operation processing unit 23 performs various operation processing necessary for controlling the object image signal. The resolution converting unit 24 performs processing on the image signal corresponding to the image object such as resolution conversion and distortion correction.

The image signal processed in the signal processor 9 is supplied to a video signal processor (not shown) for performing image compression using a compression scheme such as JPEG (Joint Photographic Experts Group) and MPEG (Moving Picture Experts Group).

The memory controller 11 controls data transmission between the signal processor 9 and the memory 12. The image signal may be in the form of an input signal supplied from the image pickup device 6 (for example, a primary color signal composed of R (red), G (green), and B (blue), i.e., raw data) and may be in the form of a luminance signal and a chrominance signal. The memory 12 is a storage device used for saving an image signal corresponding to an image object, for example.

The signal processor 9 may be implemented by an integrated circuit (hardware). The system controller 10 may be implemented by a CPU (central processing unit).

FIG. 2 is a block diagram illustrating an example of a configuration of the camera signal processing unit 22 illustrated in FIG. 1. The camera signal processing unit 22 includes a camera signal preprocessing section 41 and a camera signal postprocessing section 42. The camera signal preprocessing section 41 includes a frame operation processing portion 51.

The camera signal preprocessing section 41 performs processing on a picked up object image signal from the F/E processor 8 using various synchronizing signals supplied from the synchronizing signal generating unit 21 (FIG. 1). Such processing includes correction of shading, noise, and pixel defects which depend on the lens 1, the iris 4, and the image pickup device 6. In particular, the frame operation processing portion 51 performs a frame operation such as frame addition and frame subtraction when a multiple exposure with a long exposure time is performed.

The camera signal postprocessing section 42 generates an image signal composed of a luminance signal and a chrominance signal from a picked up image signal corresponding to the image object which has been processed by the camera signal preprocessing section 41. The camera signal preprocessing section 41 outputs an image signal in the format of an input signal from the image pickup device 6 (raw data format), and the camera signal postprocessing section 42 outputs an image signal in the format of a luminance/chrominance signal. These output signals are supplied to the memory 12 (FIG. 1) via the memory controller 11 (FIG. 1).

FIG. 3 is a block diagram illustrating an example of a configuration of the frame operation processing portion 51 illustrated in FIG. 2. The frame operation processing portion 51 includes an offset subtraction part 71, a frame addition part 72, a frame subtraction part 73, and an output signal selection part 74.

The offset subtraction part 71 subtracts a predetermined offset signal component from an input image signal supplied from the image pickup device 6 in order to suppress decreases in sensitivity and dynamic range due to an increase in the black signal level caused by a dark current which is generated particularly in a long exposure. The offset subtraction part 71 also receives an image signal stored in the memory 12 via the memory controller 11 and performs another subtraction of an offset component from the image signal received from the memory 12. The principle of the suppression of a decrease in the dynamic range achieved by the offset subtraction part 71 will be described below.

The frame addition part 72 performs image combining processing for a multiple exposure, on each of the input image signals from the image pickup device 6 (pickup device-input image signal) and the memory 12 (memory-input image signal) which have undergone offset subtraction in the offset subtraction part 71. In order to reduce fixed pattern noise caused by a dark current generated in an exposure with a long exposure time (long exposure), the frame subtraction part 73 performs subtraction of a black signal input from the image pickup device 6 from the object image signal input from the memory. The black signal is obtained by shading image pickup light from the image object while performing an exposure for the same time period as taken in picking up the object image. This processing reduces fixed pattern noise caused by a dark current.

The output signal selection part 74 selects an output signal from among output signals from the offset subtraction part 71, the frame addition part 72, and the frame subtraction part 73 and outputs the selected signal to a downstream processing unit.

Suppression of a decrease in dynamic range, which is to be achieved using the offset subtraction part 71, will now be described with reference to FIGS. 4A and 4B and FIGS. 5A and 5B. FIG. 4A schematically illustrates the intensity of light incident to the image pickup device 6 and the output signal level in a case of a normal exposure (not in a long exposure). In a normal exposure, a sufficient dynamic range can be achieved since there is no effect of an increase of the black signal level due to a dark current.

On the other hand, as illustrated in FIG. 4B, in a long exposure, the black signal level increases due to a dark current, and as a result the dynamic range of the output signal decreases. To avoid the decrease of the dynamic range in a long exposure, reading of a signal from the image pickup device 6 is performed at a time during the exposure before the output signal level is saturated. Then, the read signal is saved in the memory 12 after an offset component corresponding to the black signal level increased due to a dark current is subtracted therefrom. Subsequently, reading is similarly performed during the exposure and addition of the consecutive frames, from which the offset components have been subtracted, is performed. This processing can sufficiently suppress the decrease of dynamic range in a long exposure.

The above processing is schematically illustrated in FIGS. 5A to 5C. FIG. 5A and FIG. 5B illustrate the dynamic ranges of the output signal which correspond to time stages at which the output signal is read out during an exposure (FIG. 5A and FIG. 5B). By performing subtraction of offset components from the output signals and performing frame addition, as illustrated in FIG. 5C, a sufficient dynamic range of the output signal, which is as wide as that in a normal exposure, can be obtained.

In the following, processing performed in a multiple exposure operation in accordance with an embodiment of the present invention will be described. Prior to the description, processing which is usually performed in a multiple exposure operation in accordance with the related art will be described in order to clarify the difference between the processing performed in a multiple exposure in accordance with an embodiment of the present invention and the processing performed in a multiple exposure in accordance with the related art.

Figure 6A:
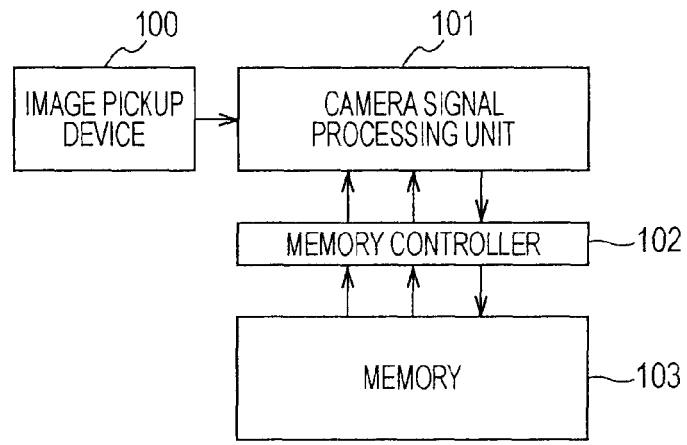
FIGS. 6A to 6C illustrate processing relating to multiple exposure according to the related art.

Processing performed in a multiple exposure in accordance with the related art will be described with reference to FIG. 6A to FIG. 8C. FIG. 6A schematically illustrates a configuration of a camera signal processing system (multiple-exposure device) according to the related art. As illustrated in FIG. 6A, the camera signal processing system includes an image pickup device 100, a camera signal processing unit 101, a memory controller 102, and a memory 103.

The image pickup device 100, the camera signal processing unit 101, the memory controller 102, and the memory 103 correspond to the image pickup device 6, the camera signal processing unit 22, the memory controller 11, and the memory 12, respectively, in the multiple-exposure device according to an embodiment of the present invention illustrated in FIG. 1.

However, the multiple-exposure devices shown in FIG. 1 and FIG. 6A are different from each other in configuration. The multiple-exposure device according to an embodiment of the present invention shown in FIG. 1 has a bus having two channels for data transmission between the camera signal processing unit 22 and the memory controller 12. In addition, a data transmission bus provided between the memory controller 11 and the memory 12 also includes two channels. On the other hand, the multiple-exposure device according to the related art illustrated in FIG. 6A has a bus having three channels for data transmission between the camera signal processing unit 101 and the memory controller 102. In addition, a data transmission bus provided between the memory controller 102 and the memory 103 also includes three channels.

Moreover, the multiple-exposure device according to the related art illustrated in FIG. 6A is not provided with a processing part having a function equivalent to the offset subtraction part 71 (FIG. 3) which subtracts an offset signal component created due to an increase in the black signal level caused by a dark current generated in a long exposure.

In the following, processing performed in a multiple exposure by a multiple-exposure device according to the related art will be described in order to explain the reason for which the multiple-exposure device according to the related art needs a three-channel bus.

Figure 6B:
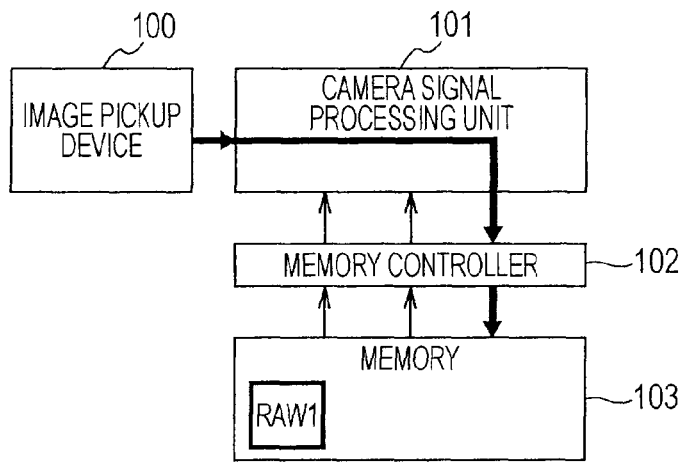
Figure 6C:
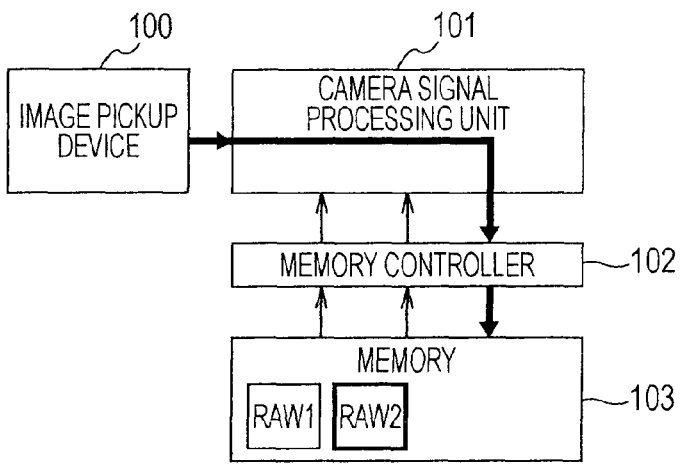

In the multiple-exposure device according to the related art, as illustrated in FIG. 6B, an object image signal RAW1 is read from the image pickup device 100 and written to the memory 103 via the memory controller 102. Then, as illustrated in FIG. 6C, reading of an object image signal RAW2 is performed again while the shutter is being released. The read signal is written to an area of the memory 103 that is different from the area in which the object image signal RAW1 has been stored. At this point, the object image signals, RAW1 and RAW2, are stored in the memory 103.

Figure 7A:
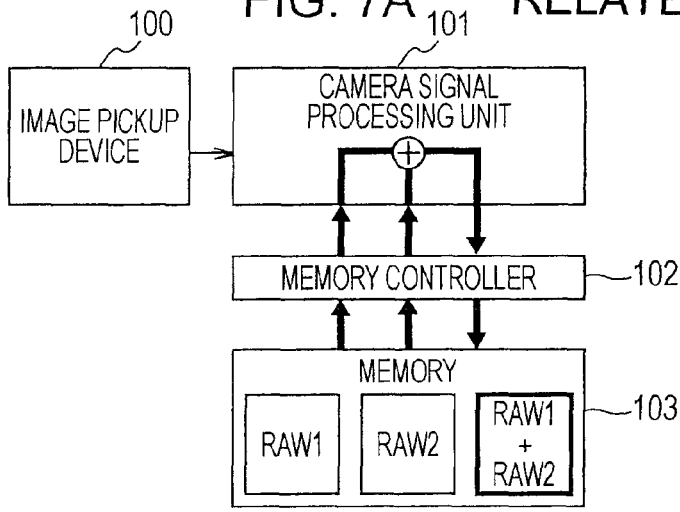
FIGS. 7A to 7C illustrate processing relating to multiple exposure according to the related art.

When these two signals are stored in the memory 103 as described above, the object image signal RAW1 and the object image signal RAW2 are read out from the memory 103 through the memory controller 102, as illustrated in FIG. 7A. Then, frame addition is performed on the object image signals and a combined image signal (RAW1+RAW2) is generated in the camera signal processing unit 101. The combined image signal (RAW1+RAW2) is stored in an area of the memory 103 that is different from the area in which the object image signal RAW1 and the object image signal RAW2 have been stored.

In this way, since two object image signals stored in the memory 103 are read and a combined image signal is stored in the memory 103, the multiple-exposure device has to be provided with a three-channel bus.

As described above, in a long exposure, a black signal to be input from the image pickup device which is obtained by shading image pickup light from an image object while performing an exposure for the same period of time as the picking up of the object image is subtracted from an object image signal to be input from the memory (RAW1 and RAW2 in the above cases). This subtraction processing can reduce fixed pattern noise caused by a dark current.

Figure 7B:
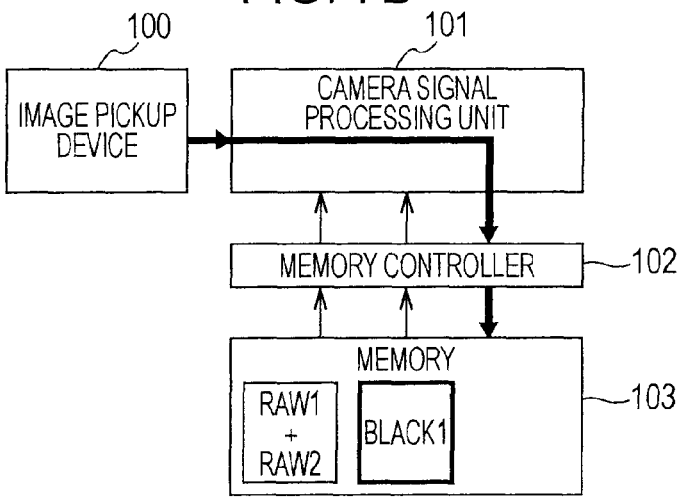

In the subtraction processing, as illustrated in FIG. 7B, a black signal BLACK1 which is obtained by shading image pickup light from the image object while performing an exposure for the same period of time as the picking up of the object image (FIG. 6B) is supplied from the image pickup device 100. Then, the black signal BLACK1 is written to an area of the memory 103 via the memory controller 102 which is different from the area in which the combined image signal (RAW1+RAW2) corresponding to the image object has been stored.

Figure 7C:
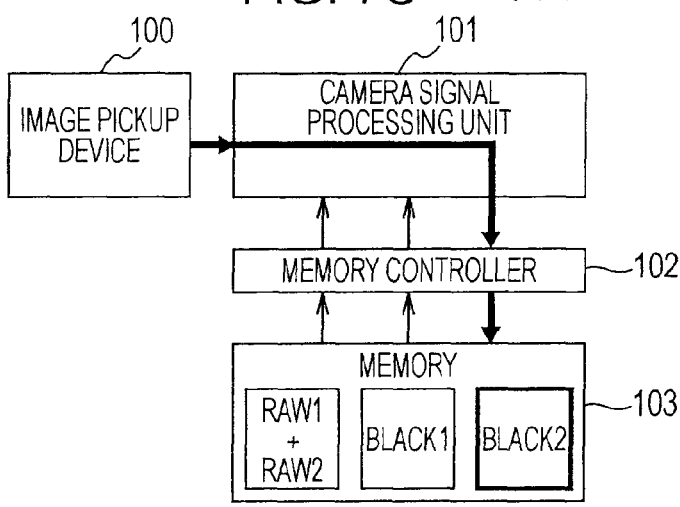

Further, as illustrated in FIG. 7C, a black signal BLACK2 obtained by shading image pickup light from the image object while performing an exposure for the same period of time as the picking up of the object image (FIG. 6C) is read out from the image pickup device 100 and written to an area of the memory 103 which is different from the areas in which the combined image signal (RAW1+RAW2) and the black signal BLACK1 have been stored.

Figure 8A:
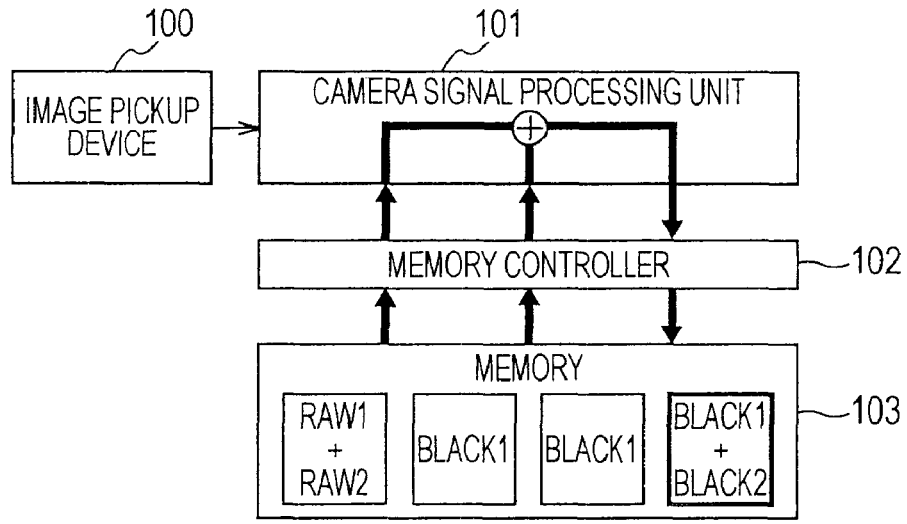
FIGS. 8A and 8B illustrate processing relating to multiple exposure according to the related art.

Then, as illustrated in FIG. 8A, the black signal BLACK1 and the black signal BLACK2 are read out from the memory 103 via the memory controller 102. Frame addition is performed by the camera signal processing unit 101 to generate a combined black signal (BLACK1+BLACK2). The combined black signal (BLACK1+BLACK2) is stored in an area of the memory 103 which is different from the area in which the combined image signal (RAW1+RAW2) has been stored.

Figure 8B:
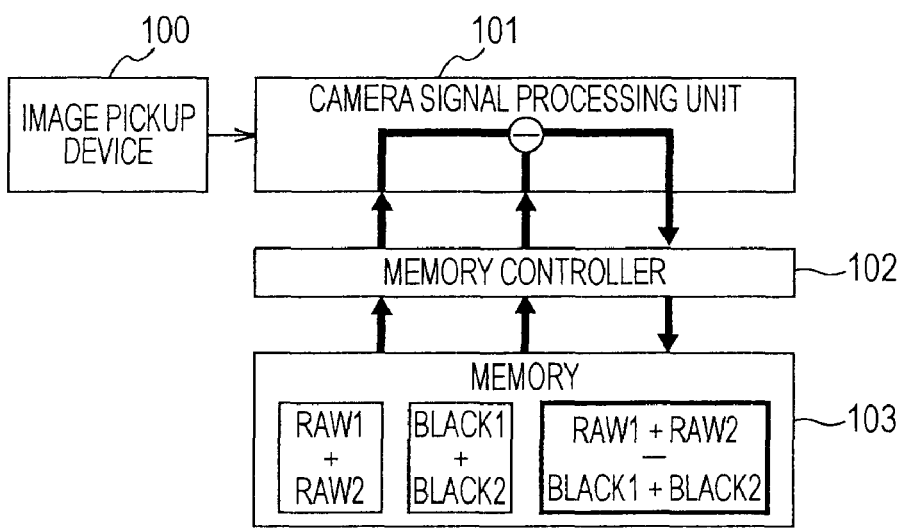

Subsequently, as illustrated in FIG. 8B, the combined image signal (RAW1+RAW2) and the combined black signal (BLACK1+BLACK2) are read out from the memory 103 via the memory controller 102, and frame subtraction is performed in the camera signal processing unit 101. The resultant signal is set as a final combined image signal ((RAW1+RAW2)−(BLACK1+BLACK2)). When the final combined image signal ((RAW1+RAW2)−(BLACK1+BLACK2)) generated in this way is written to the memory 103, a multiple-exposure image in a long exposure is finally generated.

While in the above example, a single image is generated by multiplexing two image signals (RAW1 and RAW2), a single image may similarly be generated by multiplexing more than two image signals. That is, a black image is picked up after a normal image pickup operation, and the black image is added to the image picked up in the normal image pickup operation so that a multiplexed image is generated.

In a multiple-exposure photographic method using a multiple-exposure device according to the related art which performs the above processing, it is apparent that a considerable amount of memory capacity is necessary. In the above multiple-exposure photographic processing, memory capacity for at least three frames is necessary in order to obtain the final multiple-exposure image. Therefore, the number of necessary frames increases with the increasing number of exposures (the number of combined images) in a multiple exposure. As a result an increased memory size may be necessary.

In addition, the processing performance may be deteriorated and processing time may increase as a result of storing image signals in the memory 103 in accordance with the number of exposures. In addition, in operations such as frame addition and frame subtraction performed in the camera signal processing unit 101, a data transmission bus having three channels is used: one for writing to the memory 103 and two for reading from the memory 103, which may increase the memory bandwidth.

Furthermore, in a long exposure, the dynamic range of an output signal is decreased with increasing black signal level caused by a dark current. With the method according to the related art, it is possible to reduce the increased black signal level by subtracting a pickup device-input black signal, which is obtained by shielding image pickup light from the image object while performing an exposure for the same period of time as the picking up of the object image, from a memory-input object image signal. However, the method may not cause an increase in the dynamic range.

Figure 9A:
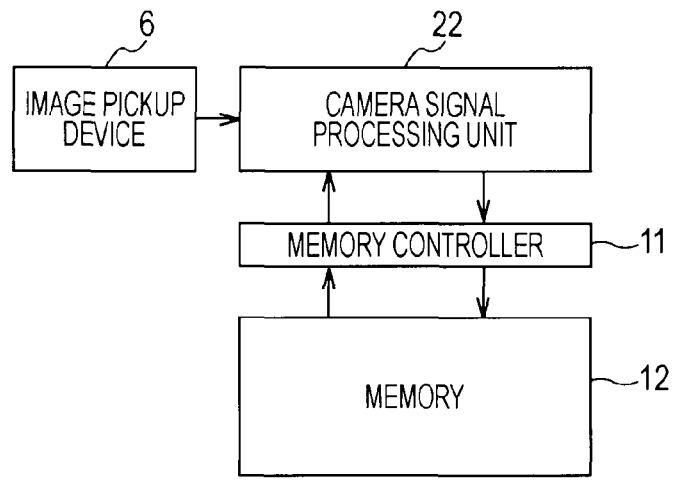
FIGS. 9A to 9C illustrate processing relating to multiple exposure according to an embodiment of the present invention.

In the following, processing relating to a multiple exposure operation which is to be performed in accordance with an embodiment of the present invention will be described. FIG. 9A illustrates a part of the multiple-exposure device shown in FIG. 1 which is necessary for the following description. As described above, a two-channel bus is used for data communication between the camera signal processing unit 22 and the memory controller 11, and a two-channel bus is also used for data communication between the memory controller 11 and the memory 12. Processing performed in a multiple exposure by such a multiple-exposure device having two-channel buses according to an embodiment of the present invention will be described below.

Figure 9B:
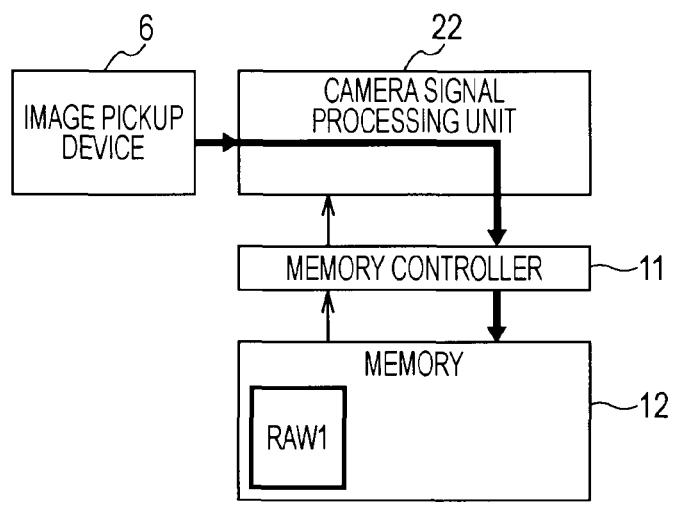

As illustrated in FIG. 9B, an object image signal RAW1 obtained in a normal image pickup operation is read out from the image pickup device 6. This object image signal RAW1 is written to the memory 12 via the memory controller 11.

In a long exposure in particular, reading of a signal from the image pickup device 6 is performed at a time during the exposure before the output signal level is saturated. Then, the read signal is written to the memory 12 after an offset component corresponding to a black signal level increased due to a dark current is subtracted therefrom by the offset subtraction part 71 (FIG. 3) in the frame operation processing portion 51.

Figure 9C:
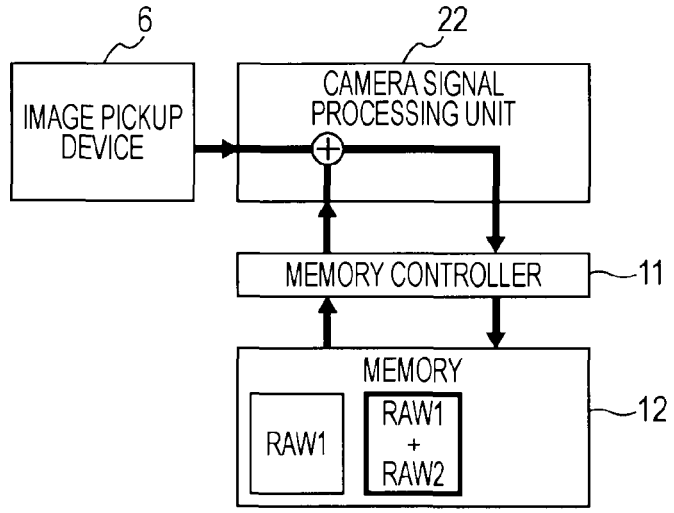

Subsequently, as illustrated in FIG. 9C, a normal pickup operation of an object image is performed again while the shutter is still being released and an object image signal RAW2 is read out from the image pickup device 6. Simultaneously with the reading, the object image signal RAW1, which has previously been obtained and stored, is read out from the memory 12 via the memory controller 11 and supplied to the camera signal processing unit 22. The object image signal RAW1 and the object image signal RAW2 are supplied to the frame operation processing portion 51 (FIG. 3) of the camera signal processing unit 22.

In the frame operation processing portion 51, frame addition is performed by the frame addition part 72 to generate a combined image signal (RAW1+RAW2). This combined image signal (RAW1+RAW2) is written to the memory 12 via the memory controller 11.

In a long exposure in particular, reading of a signal from the image pickup device 6 is performed at a time during the exposure before the output signal level is saturated. Then, the read signal is written to the memory 12 after an offset component corresponding to a black signal level increased due to a dark current is subtracted therefrom by the offset subtraction part 71 (FIG. 3) in the frame processing portion 51. Note that the combined image signal (RAW1+RAW2) may be written to the same memory area as the object image signal RAW1.

Figure 10A:
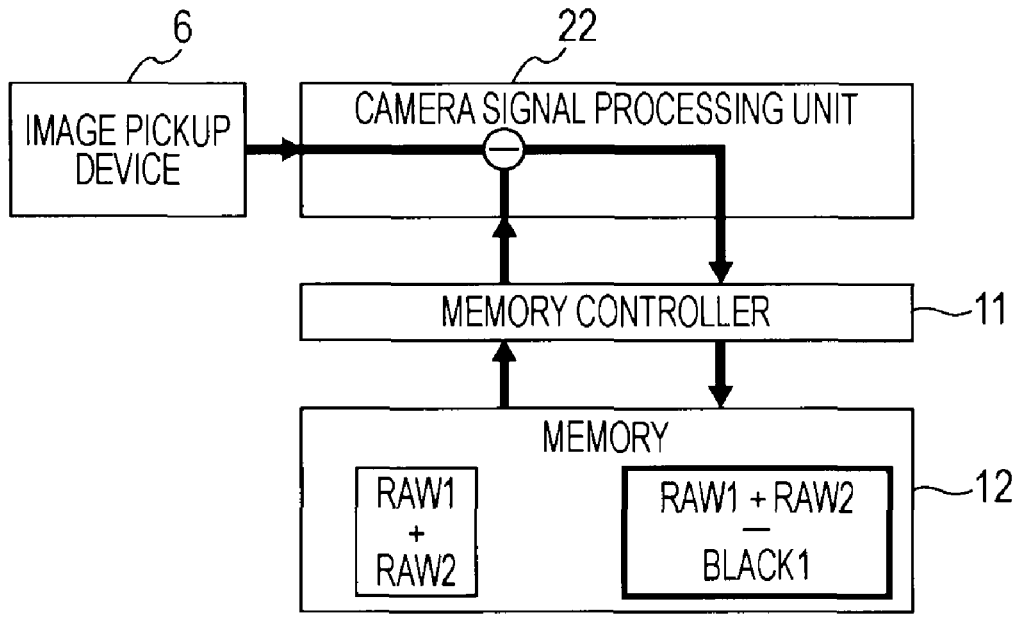
FIGS. 10A and 10B illustrate processing relating to multiple exposure according to an embodiment of the present invention.

Subsequently, as illustrated in FIG. 10A, a black signal BLACK1, which is obtained by shading image pickup light from the image object while performing an exposure for the same period of time as the picking up of the object image (FIG. 9B) is read out from the image pickup device 6. Simultaneously with the reading, the combined image signal (RAW1+RAW2) is read out from the memory 12 via the memory controller 11. The read black signal BLACK1 and the combined image signal (RAW1+RAW2) are both supplied to the frame operation processing portion 51.

Then, the frame operation processing portion 51 performs frame subtraction using the frame subtraction part 73 to generate a combined image signal (RAW1+RAW2−BLACK1). That is, the frame subtraction part 73 subtracts the black signal BLACK1 from the combined image signal (RAW1+ RAW2) and outputs the resultant signal to the output signal selection part 74. The output signal selection part 74 selects the signal input from the frame subtraction part 73 and outputs the selected signal to the memory controller 11. By this processing, the combined image signal (RAW1+RAW2− BLACK1), in which the black signal (BLACK1) is subtracted from the combined image signal (RAW1+RAW2), is written to the memory 12.

In a long exposure in particular, reading of a signal from the image pickup device 6 is performed at a time during the exposure before the output signal level is saturated. Then, the read signal is written to the memory 12 after an offset component corresponding to a black signal level increased due to a dark current is subtracted therefrom by the offset subtraction part 71 in the frame processing portion 51. Note that the combined image signal (RAW1+RAW2−BLACK1) may be written to the same memory area as the object image signal (RAW1+RAW2).

Figure 10B:
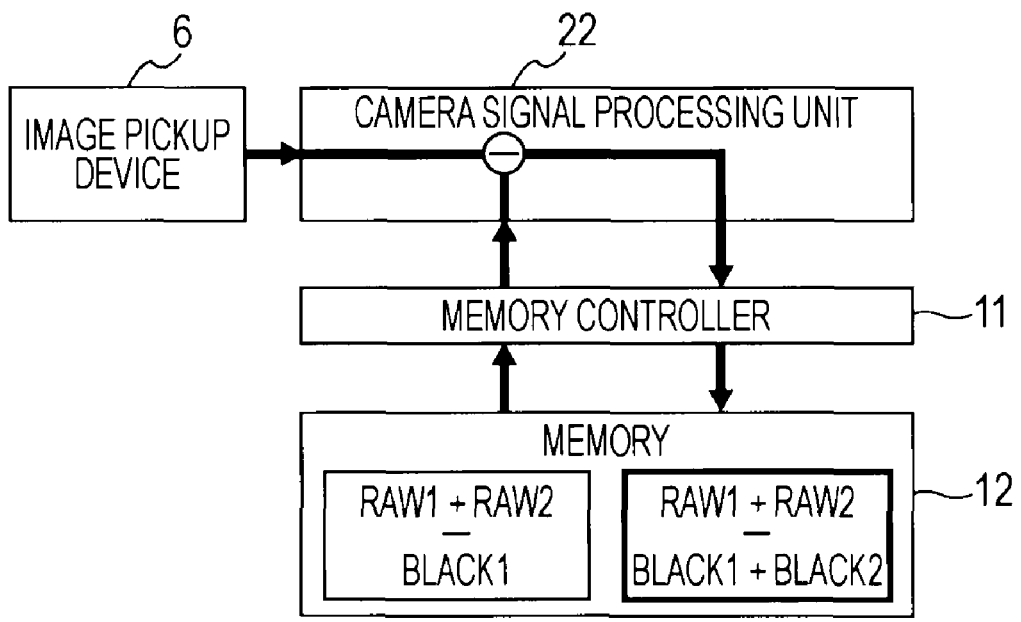

Further, as illustrated in FIG. 10B, a black signal BLACK2 which is obtained by shading image pickup light from the image object while performing an exposure for the same period of time as the picking up of the object image (FIG. 9C) is read out from the image pickup device 6. Simultaneously with the reading, the combined image signal (RAW1+ RAW2−BLACK1) is read out from the memory 12 through the memory controller 11. The read black signal BLACK2 and the combined image signal (RAW1+RAW2−BLACK1) is supplied to the frame operation processing portion 51.

The frame operation processing portion 51 performs frame subtraction using the frame subtraction part 73 to generate a combined image signal ((RAW1+RAW2)−(BLACK1+ BLACK2)) and outputs the combined image signal to the output signal selection part 74. The output signal selection part 74 selects the signal input from the frame subtraction part 73 and outputs the selected signal to the memory controller 11. Through this processing, the combined image signal ((RAW1+RAW2)−(BLACK1+BLACK2)), in which the black signal (BLACK2) is subtracted from the combined image signal (RAW1+RAW2−BLACK1), is written to the memory 12.

By executing the above processing, the combined image signal ((RAW1+RAW2)−(BLACK1+BLACK2)), which is the final multiple-exposure image signal in a long exposure, is stored in the memory 12.

In a long exposure in particular, reading of a signal from the image pickup device 6 is performed at a time during the exposure before the output signal level is saturated. Then, the read signal is written to the memory 12 after an offset component corresponding to the black signal level increased due to a dark current is subtracted therefrom by the offset subtraction part 71 in the frame processing portion 51. Note that the combined image signal ((RAW1+RAW2)−(BLACK1+ BLACK2)) may be written to the same memory area as the area in which the combined object image signal (RAW1+ RAW2−BLACK1) has been stored.

As described above, in the multiple-exposure device and processing performed in the multiple-exposure device according to an embodiment of the present invention, a memory capacity of only at least one frame is necessary for obtaining a final multiple-exposure image. Thus, reduction of necessary memory capacity may be achieved. For example, it is seen in the example illustrated in FIG. 9C that the object image signal RAW1 and the combined image signal (RAW1+ RAW2) are stored in the memory 12. However, the combined image signal (RAW1+RAW2) may be written after the object image signal RAW1 is read out, to the area in which the object image signal RAW1 has been stored. Therefore, the above processing can be performed as long as a memory capacity of only one frame is provided in the memory 12.

In addition, it is not necessary to increase the frame memory even when the number of exposures (the number of combined images) in a multiple exposure increases. The above example shows the case in which exposure is performed twice. However a memory capacity of only one frame is necessary for the processing even in the case of exposure being performed more than two times, since a stored signal is read out and a newly generated signal is written to the area in which the read signal has been stored.

Moreover, frame operation processing such as frame addition and frame subtraction is performed on the image signal read from memory 12 simultaneously with the reading of the image signal from the image pickup device. Thus, it is not necessary to save image signals depending on the number of exposures, and thus deterioration of processing performance (increase in processing time) can be suppressed.

Further, in a frame operation, such as the operations described with reference to FIG. 9C, FIG. 10A, and FIG. 10B, only a data bus carrying two channels, one for writing to the memory 12 and one for reading from the memory 12, is used for data transmission between the camera signal processing unit 22 and the memory 12. Thus, the memory bandwidth can be reduced.

Furthermore, in a long exposure, reading of a signal from the image pickup device 6 is performed at a time during exposure before the output signal level is saturated, and an offset component corresponding to a black signal level increased due to a dark current is subtracted from the read signal by the offset subtraction part 71 in the frame operation processing portion 51. This can suppress a decrease in the dynamic range of the output signal.

Figure 11:
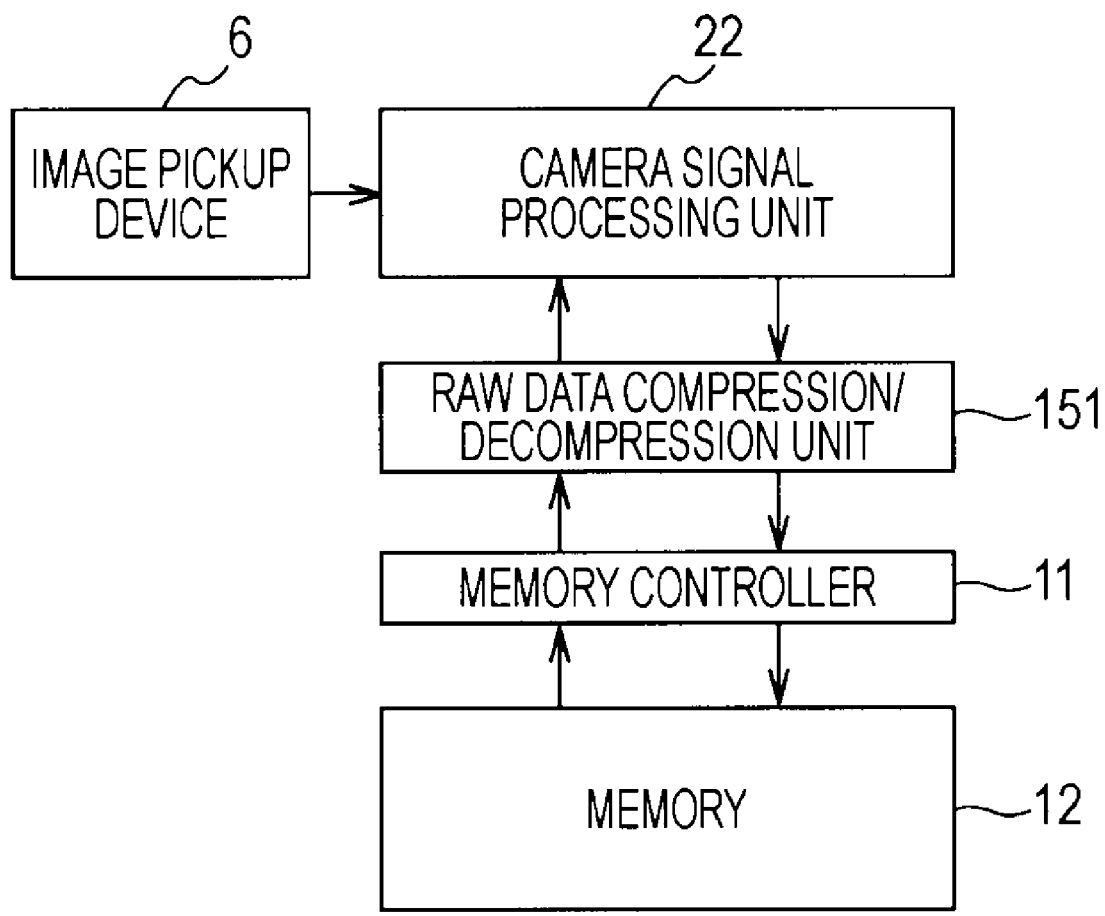
FIG. 11 illustrates another configuration of a multiple-exposure device.

Now, another configuration of a multiple-exposure device for saving the capacity of the memory 12 will be described with reference to FIG. 11. A multiple-exposure device illustrated in FIG. 11 is provided with a raw data compression/ decompression unit 151 between the camera signal processing unit 22 and the memory controller 11, in addition to the components of the multiple-exposure device illustrated in FIG. 1.

This raw data compression/decompression unit 151 has a compression portion for compressing data in the format of an input signal from the image pickup device 6 in the form of so-called raw data (e.g., a primary color signal composed of R (red), G (green), and B (blue)) and a decompression portion for decompressing a compressed signal supplied from the memory 12 into raw data.

This raw data compression/decompression unit 151 compresses and decompresses the word length of a raw data signal to a fixed length or a variable length. For example, the raw data compression/decompression unit 151 compresses a signal word length of 12 bits per one pixel into 8 bits.

Compression and decompression of raw data in a fixed or variable length may be performed by employing a technique disclosed in Japanese Unexamined Patent Application Publication No. 2007-228515, for example.

When writing or reading of a signal to and from the memory 12 via the memory controller 11 is performed by employing the configuration illustrated in FIG. 11, a row data signal is compressed or decompressed by the raw data compression/decompression unit 151. This indicates that the size of an image signal stored in the memory 12 is smaller than that of the raw data signal. Thus, further saving of the memory capacity of the memory 12 can be achieved by providing the raw data compression/decompression unit 151.

Processing other than compression of signals to be supplied to the memory 12 and decompression of signals to be supplied from the memory 12, which are performed by the raw data compression/decompression unit 151, is performed similarly to the processing relating to multiple exposure described with reference to FIG. 9A to FIG. 10B, and thus the description thereof will be omitted. Since the processing described with reference to FIG. 9A to FIG. 10B is performed, it is obvious that the various effects described above can also be achieved also when the raw data compression/decompression unit 151 is employed.

Figure 12:
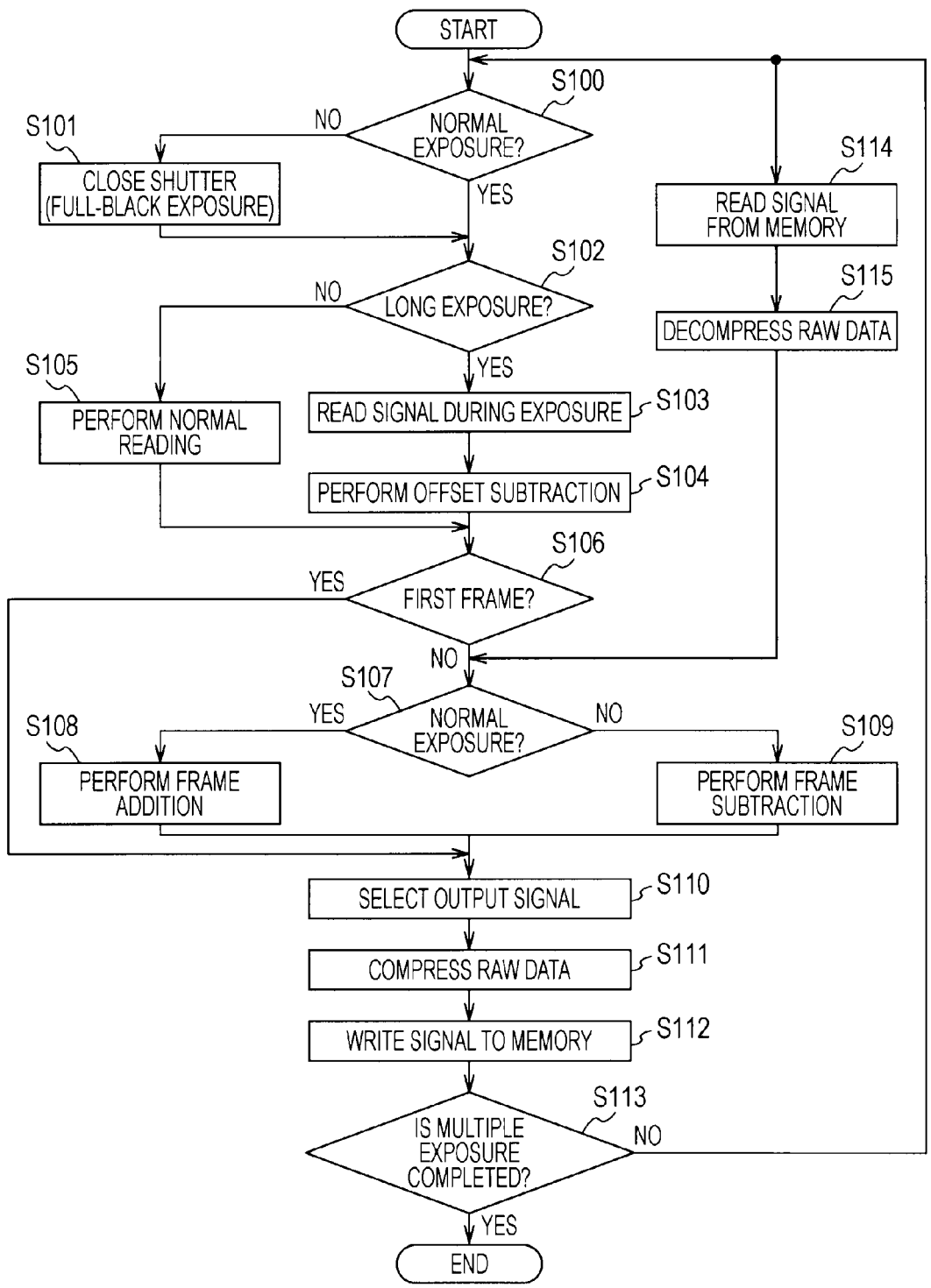
FIG. 12 is a flowchart illustrating processing performed by a multiple-exposure device.

In the following, a processing procedure to be performed in a multiple exposure in accordance with an embodiment of the present invention will be described with reference to the flowchart shown in FIG. 12.

At Step S100, it is determined whether the exposure mode set in the image pickup device 6 is a normal exposure mode or a shade mode in which image pickup light from an image object is shaded. When the exposure mode is determined to not be the normal exposure (the exposure mode is determined to be the shade mode) in Step S100, the procedure proceeds to Step S101. At Step S101, the shutter is closed to shade image pickup light from the image object, and an exposure is performed for the same time period as for the normal exposure. This processing corresponds to the processing for obtaining the black signal BLACK1 or the processing for obtaining the black signal BLACK2, which are described with reference to FIG. 10A and FIG. 10B, respectively.

On the other hand, if the exposure mode is determined to be the normal mode in Step S100, or when the processing of full-black exposure in Step S101 is completed, the processing procedure proceeds to Step S102. At Step S102, it is determined whether or not the exposure mode set in the image pickup device 6 is a long exposure mode. If the exposure mode is determined to be the long exposure mode in Step S102, the processing procedure proceeds to Step S103. At Step S103, signal reading from the image pickup device 6 is performed at a time during the exposure before the output signal level is saturated. Then, at Step S104, the offset subtraction part 71 of the frame operation processing portion 51 performs subtraction of an offset component corresponding to the black signal level, which is increased due to a dark current, from the signal read from the image pickup device 6.

On the other hand, if the exposure mode is determined to not be the long exposure mode in Step S102, normal reading of a signal from the image pickup device 6 is performed at Step S105. The normal reading refers to reading processing in which a signal is not read from the image pickup device 6 during an exposure.

When the processing of Step S104 or the processing of Step S105 is completed, the processing procedure proceeds to Step S106. At Step S106, the number of frames to be processed is determined and it is also determined whether or not the frame which is being processed is a first frame. If the processed frame is determined to not be the first frame, the processing procedure proceeds to Step S107. At Step S107, determination of the exposure mode set in the image pickup device 6 is performed again. If the exposure mode is determined to be the normal exposure mode in Step S107, the processing procedure proceeds to Step S108.

At Step S108, the frame addition part 72 performs frame addition to generate a combined image signal. This processing corresponds to the processing described with reference to FIG. 9C, for example, in which multiplexed object image signals (RAW1 and RAW2) are added together. In the flowchart in FIG. 12, an object image signal is obtained from the image pickup device 6 through the procedure from Step S100 to Step S107 and an object image signal is obtained from the memory 12 through the procedure until Step S115, which will be described below, and these object image signals are added together in Step S108.

On the other hand, if the exposure mode is determined to not be the normal exposure mode (i.e., the exposure mode is determined to be the shade mode) in Step S107, the processing procedure proceeds to Step S109. At Step S109, the frame subtraction part 73 performs frame subtraction to generate a combined image signal. This processing corresponds to the processing illustrated in FIG. 10A or the processing illustrated in FIG. 10B, for example. In the processing described with reference to FIG. 10A, the black signal BLACK1 is subtracted from the combined image signal (RAW1+RAW2), and the combined image signal (RAW1+RAW2−BLACK1) is generated. According to the flowchart in FIG. 12, a black signal is obtained from the image pickup device 6 through the procedure from Step S100 to S107 and a combined image signal is obtained by through the procedure until Step S115, which will be described below, and subtraction is performed on these signals in Step S109.

On the other hand, if it is determined in Step S106 that the frame being processed is the first frame, the processing procedure proceeds to Step S110. The processing of Step S110 is also performed after the processing of Step S108 or the processing of Step S109 is completed. At Step S110, the output signal selection part 74 selects an output signal from among signals output from the offset subtraction part 71, the frame addition part 72, and the frame subtraction part 73 and outputs the selected signal to the memory controller 11. In this selection processing of Step S110, when it is performed subsequently to the processing of Step S106, the output signal selection part 74 selects the output signal from the offset subtraction part 71. When the processing of Step S110 is performed subsequently to the processing of Step S108 or Step S109, the output signal selection part 74 selects the output signal from the frame addition part 72 or the frame subtraction part 73, respectively.

When the multiple-exposure device configured to have the raw data compression/decompression unit 151 illustrated in FIG. 11 is employed, at Step S111, compression processing is performed on a raw data signal selected by the output signal selection part 74. Then, at Step S112, the compressed signal is written to the memory 12 via the controller 11.

At Step S113, it is determined if the multiple exposure operation is terminated. If it is determined in Step S113 that a predetermined number of exposures has not yet been performed, the processing procedure returns to Step S100 to repeat the processing procedure of Step S100 and thereafter. While the processing from Step S100 is repeated, processing of Step S114 and thereafter is performed. An object image signal or a black signal is obtained from the image pickup device 6 by repeating the processing procedure from Step S100, and at the same time, a signal is read from the memory 12 by performing the processing of Step S114 and thereafter. That is, a raw data signal is read from the memory 12 via the memory controller 11 at Step S114, and the raw data signal read from the memory 12 is decompressed by the raw data compression/decompression unit 151 at Step S115.

The decompressed signal is input to the frame operation processing portion 51. Then, the exposure mode is determined at Step S107 and predetermined frame operation processing is performed. The above processing is repeated until the predetermined number of exposures has been performed.

On the other hand, if it is determined that the predetermined number of exposures has been performed and thus that the multiple exposure processing is completed, the processing procedure is terminated.

As described above, according to an embodiment of the present invention, a memory capacity of only at least one frame is necessary for obtaining a final multiple-exposure image. Thus, saving of memory capacity may be achieved. In addition, it is not necessary to increase the frame memory even when the number of exposures (the number of combined images) increases. Further saving of memory capacity may be achieved by employing the raw data compression/decompression unit 151.

Moreover, frame operation processing is performed on an image signal that is read out from the memory 12 simultaneously with signal reading from the image pickup device 6. Thus, since it is not necessary to hold the read image signal in the memory 12 depending on the number of exposures in a multiple exposure, deterioration of processing performance (increase in processing time) can be prevented.

Further, in the above frame operation processing, a data bus carrying only two channels, one for writing to the memory 12 and one for reading from the memory 12, is used for data transmission between the memory 12 and camera signal processing unit 22. Thus, processing with a reduced memory bandwidth can be achieved.

Furthermore, in a long exposure, reading of a signal from the image pickup device is performed at a time during the exposure before the output signal level is saturated, and an offset component corresponding to a black signal level increased due to a dark current is subtracted from the read signal using the offset subtraction part 71 in the frame operation processing portion 51. Accordingly, deterioration of the dynamic range of the output signal can be suppressed.

While the above example of an embodiment of the present invention illustrates the case of a double exposure (two frames), similar effects can be achieved even in the case of a multiple exposure with three or more exposures.

In the above example of an embodiment of the present invention, the signal processor 9 is configured by an integrated circuit (hardware). However, all or some of the above-described components may be implemented as software by a computer or the like. Also in this case, effects similar to those in the above example can be achieved.

When processing procedures are executed by software, a program constituting the software is installed from a program recording medium to a computer incorporated in dedicated hardware or a general-purpose personal computer capable of executing various functions by installing various programs.

Figure 13:
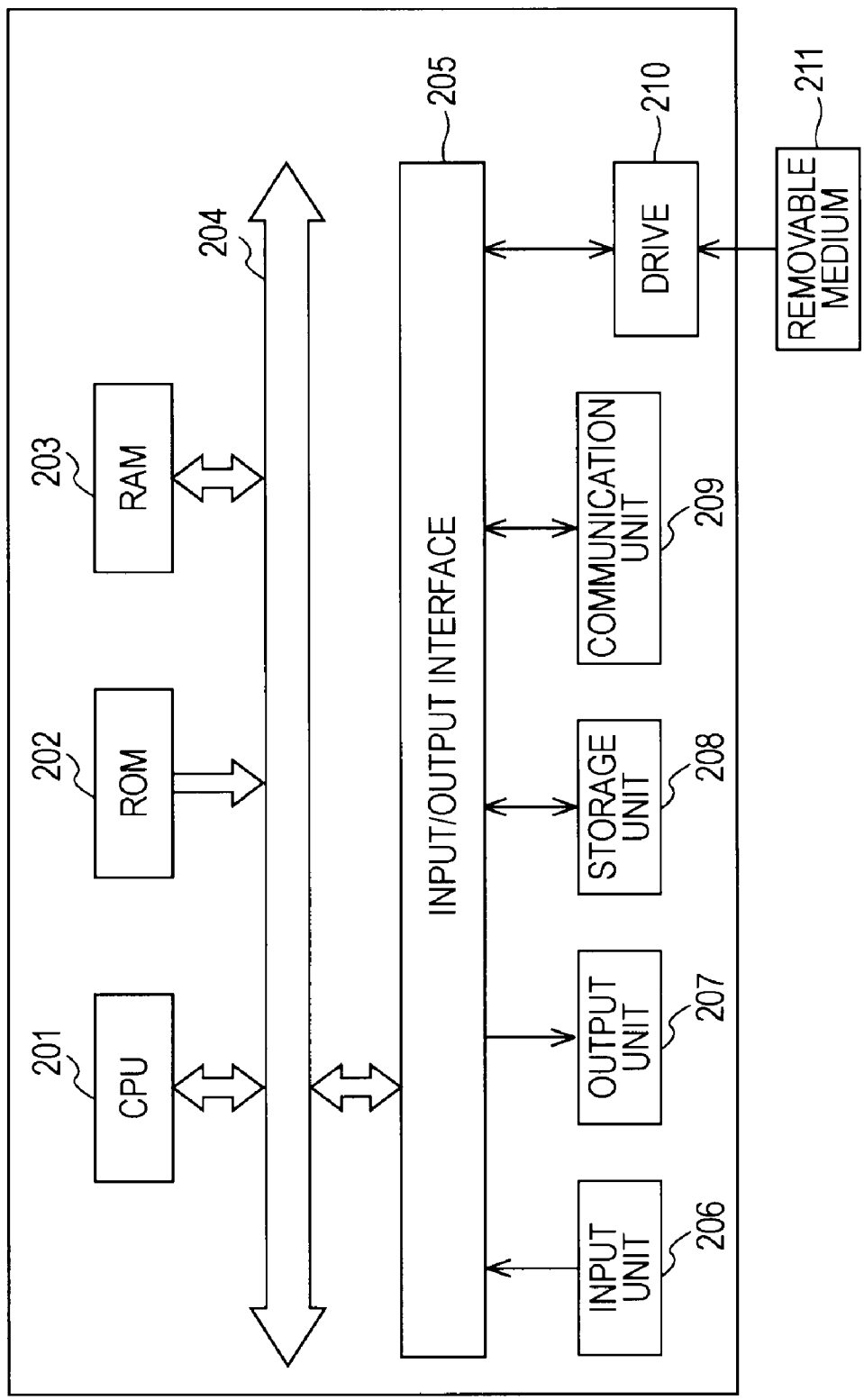
FIG. 13 illustrates a hardware configuration of a personal computer.

FIG. 13 is a block diagram illustrating a hardware configuration of a personal computer for executing the above processing procedures in accordance with programs.

In the personal computer, a CPU (central processing unit) 201, a ROM (read-only memory) 202, and a RAM (random access memory) 203 are interconnected via a bus 204.

The bus 204 is also connected to an input/output interface 205. The input/output interface 205 is connected to an input unit 206 constituted by a keyboard, a mouse, a microphone, and the like, an output unit 207 constituted by a display, a speaker and the like, a storage unit 208 constituted by a hard disk, a non-volatile memory, and the like, a communication unit 209 constituted by a network interface and the like, and a drive 210 for driving a removable medium 211 such as a magnetic disk, an optical disk, a magneto-optical disk, and a semiconductor memory.

In the computer having the above configuration, the CPU 201 loads a program stored in the storage unit 208, for example, to the RAM 203 via the input/output interface 205 and the bus 204, thereby performing the above processing procedures.

The program to be executed by the computer (CPU 201) is stored in the removable medium 211 serving as a package medium such as a magnetic disk (including a flexible disk), an optical disk (including a CD-ROM (compact disc-read only memory)), a DVD (digital versatile disc)), a magneto-optical disk, and a semiconductor memory. Alternatively, the program may be provided through wired or wireless transmission, such as a local area network, the Internet, and digital satellite broadcasting.

The program can be installed in the storage unit 208 through the input/output interface 205 when the removable medium 211 is mounted in the drive 210. The program may also be received by the communication unit 209 through a wired or wireless transmission medium and then installed in the storage unit 208. Alternatively, the program may be installed in the ROM 202 or the storage unit 208 in advance.

The program to be executed by the computer may be processed in time series in accordance with the processing sequence described above or may be processed in parallel. The program may also be processed when necessary, for example, in response to a call.

In the present specification, the term "system" refers to the entire apparatus constituted by a plurality of components.

The present application contains subject matter related to that disclosed in Japanese Priority Patent Application JP 2008-218010 filed in the Japan Patent Office on Aug. 27, 2008, the entire content of which is hereby incorporated by reference.

It should be understood that various modifications may be made without departing from the scope of the present invention.

What is claimed is:

1. An image pickup apparatus comprising:
   frame operating means for performing an addition operation to a first image read directly from an image pickup device with a second image read from a storing means to form a combined image and for performing a subtraction operation of a black signal, read directly from the image pickup device, from the combined image read from the storing means; and
   storing means for storing a result of an operation performed by the frame operating means,
   wherein a data bus is provided between the frame operating means and the storing means, the bus including two channels, one of the channels being used for writing to the storing means and the other one of the channels being used for reading from the storing means.

2. An image pickup apparatus comprising:
   a frame operation unit configured to perform an addition operation to a first image read directly from an image pickup device with a second image read from a storage unit to form a combined image and to perform a subtraction operation of a black signal, read directly from the image pickup device, from the combined image read from the storage unit; and
   the storage unit configured to store a result of an operation performed by the frame operation unit, wherein
   a data bus is provided between the frame operation unit and the storage unit, the bus including two channels, one of the channels being used for writing to the storage unit and the other one of the channels being used for reading from the storage unit, and the frame operating unit reduces fixed pattern noise via the subtraction operation of the black signal read directly from the image pickup device from the combined image read from the storage unit.

3. The image pickup apparatus of claim 2, wherein the frame operation unit includes an offset subtracting unit configured to subtract a predetermined offset signal from a signal supplied from the image pickup device.

4. The image pickup apparatus of claim 3, wherein reading of the signal from the image pickup device is performed at a time during an exposure before the output signal level of the image pickup device is saturated, and subtraction of an offset signal component from the signal read from the image pickup device is performed by the offset subtracting unit.

5. The image pickup apparatus of claim 2, wherein a signal in a raw data format supplied from the frame operation unit is compressed and then stored in the storage unit, and the compressed signal supplied from the storage unit is decompressed into a raw data format and then supplied to the frame operation unit.

6. The image pickup apparatus of claim 2, wherein in the addition operation and in the subtraction operation, the frame operation unit performs frame operation processing on an image read from the storing unit, simultaneously with reading from the image pickup device.

7. The image pickup apparatus of claim 2, wherein an exposure time of the black signal read directly from the image pickup device is for the same period of time as an exposure time taken to obtain one of the images within the combined image.

8. An image pickup method for an image pickup apparatus including at least an image pickup device, a storing unit configured to store a signal from the image pickup device, an operating unit configured to perform an operation using a signal directly from the image pickup device and a signal stored in the storing unit, the method comprising the steps of:
storing a first signal in the storing unit, the first signal being obtained from the image pickup device when an image of a predetermined image object is picked up;
when a second signal is obtained from the image pickup device,
reading the first signal stored in the storing unit,
adding the second signal to the first signal stored in the storing unit, and
storing the result of the adding in the storing unit;
after the adding is repeated a predetermined number of times,
obtaining a black signal from the image pickup device, the black signal being obtained by performing an exposure for the same period of time as an exposure time taken to obtain one of the signals within the result of the adding,
reading the result of the adding stored in the storing unit,
subtracting the black signal from the result of the adding, and
storing the result of the subtracting in the storing unit; and
repeating the subtracting a predetermined number of times.

9. The image pickup method of claim 8, further comprising the step of subtracting a predetermined offset signal component from a signal supplied from the image pickup device.

10. The image pickup method of claim 9, wherein reading of a signal from the image pickup device is performed at a time during an exposure before the output signal level of the image pickup device is saturated, and the subtracting an offset signal component from the signal read from the image pickup device is performed.

11. A non-transitory computer-readable storage medium having a computer-readable program stored thereon that when executed by a computer causes an image pickup apparatus to perform a method, the image pickup apparatus including at least an image pickup device, a memory configured to store a signal from the image pickup device, and a frame operation processing portion configured to perform an operation using the signal directly from the image pickup device and a signal stored in the memory, the method comprising the steps of:
storing a first signal in the memory, the first signal being obtained from the image pickup device when an image of a predetermined image object is picked up;
when a second signal is obtained from the image pickup device,
reading the first signal stored in the memory,
adding the second signal to the first signal stored in the memory, and
storing the result of the adding in the memory;
after the adding is repeated a predetermined number of times,
obtaining a black signal from the image pickup device, the black signal being obtained by performing an exposure for the same period of time as an exposure time taken to obtain one of the signals within the result of the adding,
reading the result of the adding stored in the memory,
subtracting the black signal from the result of the adding, and
storing the result of the subtracting in the memory; and
repeating the subtracting a predetermined number of times.

* * * * *